United States Patent
Molés Cases et al.

(10) Patent No.: US 11,201,640 B2
(45) Date of Patent: Dec. 14, 2021

(54) METHOD AND APPARATUS FOR PHASE TRACKING-REFERENCE SIGNAL (PT-RS) PORT SELECTION IN DOWNLINK

(71) Applicant: Telefonaktiebolaget LM Ericsson (publ), Stockholm (SE)

(72) Inventors: Vicent Molés Cases, Nules (ES); Mattias Frenne, Uppsala (SE); Lars Lindbom, Karlstad (SE); Karl Werner, Segeltorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/623,582

(22) PCT Filed: Jun. 27, 2018

(86) PCT No.: PCT/IB2018/054780
§ 371 (c)(1),
(2) Date: Dec. 17, 2019

(87) PCT Pub. No.: WO2019/003160
PCT Pub. Date: Jan. 3, 2019

(65) Prior Publication Data
US 2020/0186208 A1    Jun. 11, 2020

Related U.S. Application Data

(60) Provisional application No. 62/525,853, filed on Jun. 28, 2017.

(51) Int. Cl.
*H04B 7/02* (2018.01)
*H04B 7/0417* (2017.01)
(Continued)

(52) U.S. Cl.
CPC ......... *H04B 7/0417* (2013.01); *H04B 7/0478* (2013.01); *H04L 5/0051* (2013.01)

(58) Field of Classification Search
CPC .... H04B 7/0417; H04B 7/0478; H04L 5/0051
(Continued)

(56) References Cited

U.S. PATENT DOCUMENTS 8,670,379 B2 *  3/2014  Yamada ................ H04L 1/0026
                                                        370/328
9,203,552 B2 * 12/2015  Geirhofer ............ H04B 7/0639
(Continued)

OTHER PUBLICATIONS

"3rd Generation Partnership Project; Technical Specification Group Radio Access Network; Study on New Radio Access Technology Physical Layer Aspects (Release 14)", 3GPP Standard; Technical Report; 3GPP TR 38.802, 3rd Generation Partnership Project (3GPP), Mobile Competence Centre; 650, Route Des Lucioles; F-06921 Sophia-Antipolis Cedex; France, vol. RAN WG1, No. V14.1.0, Jun. 23, 2017 (Jun. 23, 2017), pp. 1-143, XP051299025, consisting of 143 pages.
(Continued)

*Primary Examiner* — Helene E Tayong
(74) *Attorney, Agent, or Firm* — Christopher & Weisberg, P.A.

(57) ABSTRACT

Methods and apparatuses are disclosed for PT-RS selection. In one embodiment, a wireless device is configured to determine a layer based at least on a precoder associated with a precoder matrix indicator, PMI; and transmit an indication of the determined layer to a network node as part of channel state information, CSI, feedback. In other embodiments, a network device is configured to receive an indication of a layer for a phase-tracking reference signal, PT-RS, transmission as part of channel state information, CSI, feedback; determine a precoder based at least on the indication of the layer for the PT-RS transmission; and
(Continued)

transmit the PT-RS, the PT-RS transmission associated with the indicated layer and a PT-RS port.

16 Claims, 9 Drawing Sheets

(51) Int. Cl.
H04B 7/0456 (2017.01)
H04L 5/00 (2006.01)

(58) Field of Classification Search
USPC .......................................................... 375/267
See application file for complete search history.

(56) References Cited

U.S. PATENT DOCUMENTS

| | | | |
|---|---|---|---|
| 2016/0278119 A1 | 9/2016 | Nammi | |
| 2018/0234959 A1* | 8/2018 | Ahn | H04W 72/042 |
| 2020/0021489 A1* | 1/2020 | Gao | H04W 24/10 |
| 2020/0028609 A1* | 1/2020 | Ahn | H04W 72/12 |

OTHER PUBLICATIONS

Lenovo et al: "Remaining issues on PTRS", 3GPP Draft; R1-1715538, 3rd Generation Partnership Project (3GPP), Mobile Competence Centre; 650, Route Des Lucioles ; F-06921 Sophia-Antipolis Cedex; France , vol. RAN WG1, No. Nagoya, Japan; Sep. 18, 2017-Sep. 21, 2017; Sep. 11, 2017 (Sep. 11, 2017), XP051329069, consisting of 3 pages.

Ericsson: "Feature lead summary 1 of PT-RS", 3GPP Draft; R1-1800997 Feature Lead Summary 1 of PTRS_Final, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018; Jan. 23, 2018 (Jan. 23, 2018), XP051385245, consisting of 9 pages.

International Search Report and Written Opinion of the International Searching Authority dated Sep. 27, 2018 issued in PCT Application No. PCT/IB2018/054780, consisting of 15 pages.

Written Opinion of the International Preliminary Examining Authority dated May 20, 2019 issued in PCT Application No. PCT/IB2018/054780, consisting of 9 pages.

Notification of Transmittal of the International Preliminary Report on Patentability dated Aug. 2, 2019 issued in PCT Application No. PCT/IB2018/054780, consisting of 11 pages.

* cited by examiner

METHOD AND APPARATUS FOR PHASE TRACKING-REFERENCE SIGNAL (PT-RS) PORT SELECTION IN DOWNLINK

CROSS-REFERENCE TO RELATED APPLICATIONS

This application is a Submission Under 35 U.S.C. § 371 for U.S. National Stage Patent Application of International Application No.: PCT/IB2018/054780, filed Jun. 27, 2018 entitled "METHOD AND APPARATUS FOR PHASE TRACKING-REFERENCE SIGNAL (PT-RS) PORT SELECTION IN DOWNLINK," which claims priority to U.S. Provisional Application No. 62/525,853, filed Jun. 28, 2017, entitled "METHOD FOR PT-RS PORT SELECTION IN DOWNLINK," the entireties of both of which are incorporated herein by reference.

TECHNICAL FIELD

Wireless communication and in particular, to a wireless device, network node, and method for phase tracking-reference signal (PT-RS) port selection.

BACKGROUND

The physical layer of New Radio (NR), i.e., third generation partnership project (3GPP) 5G mobile radio systems, is expected to handle a vast number of different transmission scenarios by operating in the frequency range from below 1 GHz to 100 GHz. Carrier frequencies above 6 GHz are not supported by Long Term Evolution (LTE), so NR uses a new and flexible design for the physical layer which offers good performance in a wider range of frequencies compared to the physical layer of LTE.

Similar to LTE, NR will use OFDM based waveforms with reference signals and physical layer channels mapped on a time-frequency resource grid. NR has an ultra-lean design that minimizes always-on transmissions to enhance network energy efficiency and ensure forward compatibility. In contrast to the setup in LTE, the reference signals in NR are transmitted only when necessary. Demodulation reference signal (DMRS) and phase-tracking reference signal (PT-RS) are two variations of reference signals among the others.

Figure 1A:
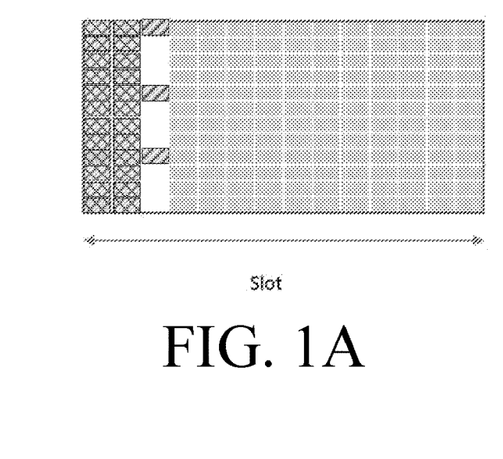
FIGS. 1A-1B illustrate the potential DMRS resource mapping in the frequency-time grid for low Doppler in the transmission slot.
Figure 1B:
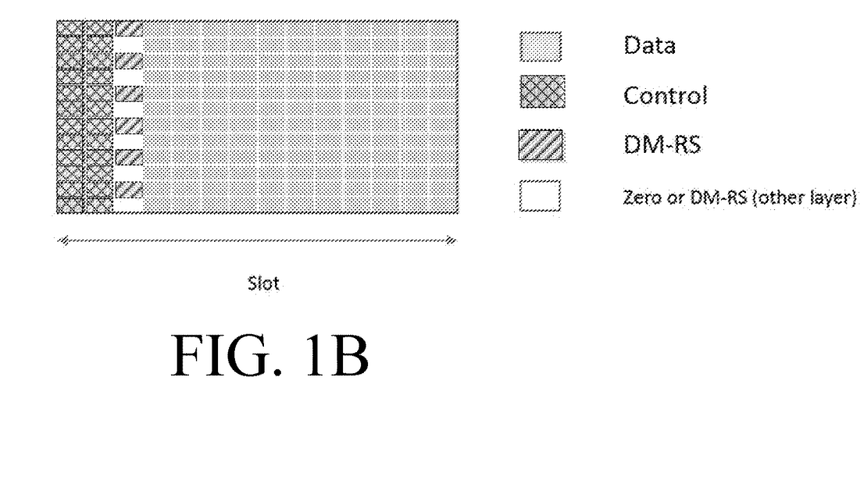
Figure 2A:
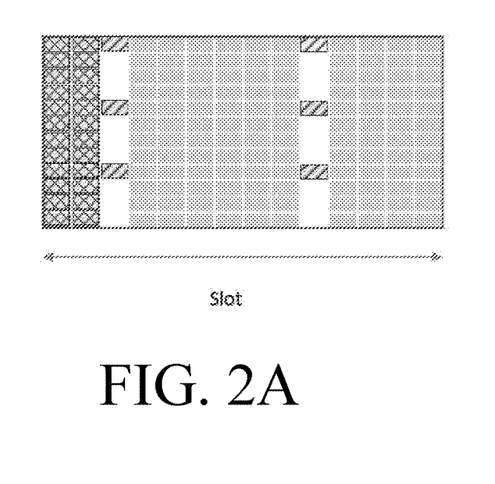
FIGS. 2A-2B illustrate the potential DMRS resource mapping in the frequency-time grid for high Doppler in the transmission slot.
Figure 2B:
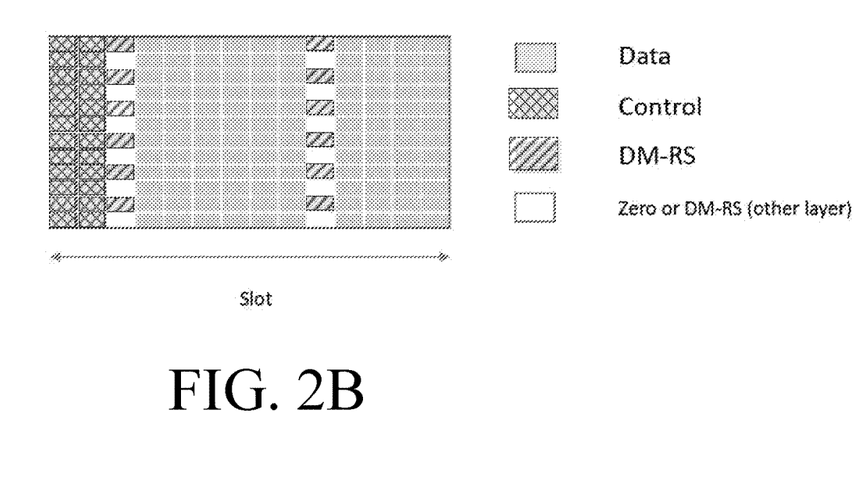

DMRS is used to estimate the radio channel for demodulation. DMRS is wireless device-specific, can be beamformed, confined in a scheduled resource, and transmitted only when necessary, both in the DL (from base station to wireless device) and the UL (from wireless device to base station). To support multiple-layer MIMO transmission, multiple orthogonal DMRS ports can be scheduled, one for each layer. Orthogonality is achieved by FDM (comb structure), TDM and CDM (with cyclic shift of the root sequence or orthogonal cover codes). The basic DMRS pattern is front loaded, as the DMRS design takes into account the early decoding requirement to support low-latency applications. For low-speed scenarios, DMRS uses low density in the time domain. However, for high-speed scenarios, the time density of DMRS is increased to track fast changes in the radio channel. FIGS. 1A-1B illustrate the potential DMRS resource mapping in the frequency-time grid for low Doppler in the transmission slot. For example, FIGS. 1A-1B show some DMRS patterns in NR for supporting early decoding and low Doppler. FIGS. 2A-2B illustrate the potential DMRS resource mapping in the frequency-time grid for high Doppler in the transmission slot. For example, FIGS. 2A-2B show some DMRS patterns/structure in NR for supporting early decoding and high Doppler and/or high UE mobility.

Another challenge that NR faces is the Radio-frequency impairments when wireless systems operate in the mmWave band, specifically, the effects of phase noise produced by the local oscillators. The degradation produced by phase noise increases with increasing carrier frequency.

SUMMARY

Some embodiments advantageously provide a method and system for wireless communication method, wireless device and network node for PT-RS port selection in the downlink.

One or more embodiments described herein can be divided in three different and complementary procedures:

The wireless device includes, in the channel state information (CSI)-feedback, an indication of which layer (in relation to the precoder associated with the reported PMI) is preferred for PT-RS transmission. This information is jointly encoded with the rank Indicator to reduce payload size due to the extra feedback.

The network node, e.g., gNB, uses the information obtained with the CSI-feedback together with the indication of the preferred layer for PT-RS transmission to compute a precoder in such a way that the DMRS port with lowest index within the DMRS group is transmitted using the precoder weights that correspond to the preferred layer for PT-RS of the CSI feedback in the previous step.

The wireless device and network node use a fixed association rule for associating PT-RS with the DMRS port with lowest index within the DMRS group. With this solution, the wireless device knows in which port PT-RS has been transmitted without any additional signalling.

At least one advantage provided by the teachings of the disclosure is that PT-RS is never transmitted in the DMRS port with worst SINR, at least in part, due to the one bit added to the CSI-feedback information, while not requiring any additional signalling in the downlink.

One embodiment of the process includes:
The wireless device determining the desired precoder and rank using downlink reference signals;
The wireless device determining which layer is preferred for PTRS given the determined precoder (for example using expected SINR as metric);
Informing the network node about the required permutation in the precoder;
Assuring that the DMRS port with the lowest index within the DMRS group is not the port with the worst SINR compared to the rest of the ports; and
Associating the PT-RS to one of the DMRS ports in the DMRS group.

In one or more embodiments, the above steps may be used individually.

According to one aspect of the disclosure, a wireless device is disclosed. The wireless device includes processing circuitry including a memory and a processor. The processing circuitry is configured to determine a layer based at least on a precoder associated with a precoder matrix indicator, PMI; and transmit an indication of the determined layer to a network node as part of channel state information, CSI, feedback.

According to this aspect, in some embodiments, the processing circuitry is further configured to transmit the indication of the determined layer to the network node as part of the CSI feedback by being further configured to transmit the indication of the determined layer in uplink control information, UCI. In some embodiments, the indication of the determined layer is transmitted based at least on a joint signalling of a rank indicator, RI, and a column permutation indicator, CPI. In some embodiments, the processing circuitry is further configured to receive a transmission including at least a phase tracking reference signal, PT-RS, transmission, the PT-RS transmission associated with the determined layer and a PT-RS port. In some embodiments, the PT-RS port is associated with a DeModulation Reference Signal, DMRS, port within a DMRS group. In some embodiments, the PT-RS port is associated with a DeModulation Reference Signal, DMRS, port having a lowest index in a DMRS group. In some embodiments, the PT-RS port association with the DMRS is a predefined association. In some embodiments, the predefined association is a fixed association rule for associating the PT-RS port with the DMRS port having a lowest index with the DMRS group. In some embodiments, the PT-RS transmission is associated with a column of the precoder, the precoder being permutated according to the predefined association between the PT-RS port and the DMRS port. In some embodiments, the received PT-RS transmission uses precoder weights of the precoder, the precoder weights corresponding to the determined layer. In some embodiments, the indication of the layer indicates a column of the precoder associated with the PMI. In some embodiments, the precoder is determined based at least on a received downlink signal.

According to another aspect, a method for a wireless device is disclosed. The method includes determining a layer based at least on a precoder associated with a precoder matrix indicator, PMI; and transmitting an indication of the determined layer to a network node as part of channel state information, CSI, feedback.

According to this aspect, in some embodiments, the transmitting the indication of the determined layer to the network node as part of the CSI feedback further includes transmitting the indication of the determined layer in uplink control information, UCI. In some embodiments, the indication of the determined layer is transmitted based at least on a joint signalling of a rank indicator, RI, and a column permutation indicator, CPI. In some embodiments, the method further includes receiving a transmission including at least a phase tracking reference signal, PT-RS, transmission, the PT-RS transmission associated with the determined layer and a PT-RS port. In some embodiments, the PT-RS port is associated with a DeModulation Reference Signal, DMRS, port within a DMRS group. In some embodiments, the PT-RS port is associated with a DeModulation Reference Signal, DMRS, port having a lowest index in a DMRS group. In some embodiments, the PT-RS port association with the DMRS port is a predefined association. In some embodiments, the predefined association is a fixed association rule for associating the PT-RS port with the DMRS port having a lowest index within the DMRS group. In some embodiments, the PT-RS transmission is associated with a column of the precoder, the precoder being permutated according to the predefined association between the PT-RS port and the DMRS port. In some embodiments, the received PT-RS transmission uses precoder weights of the precoder, the precoder weights corresponding to the determined layer. In some embodiments, the indication of the layer indicates a column of the precoder associated with the PMI. In some embodiments, the precoder is determined based at least on a received downlink signal.

According to yet another aspect of the disclosure, a network node is disclosed. The network node includes processing circuitry including a memory and a processor. The processing circuitry is configured to receive an indication of a layer for a phase-tracking reference signal, PT-RS, transmission as part of channel state information, CSI, feedback; determine a precoder based at least on the indication of the layer for the PT-RS transmission; and transmit the PT-RS, the PT-RS transmission associated with the indicated layer and a PT-RS port.

According to this aspect, in some embodiments, the processing circuitry is further configured to receive the indication of the layer for the PT-RS transmission as part of the CSI feedback in uplink control information, UCI. In some embodiments, the indication of the layer is based at least on a joint signalling of a rank indicator, RI, and a column permutation indicator, CPI. In some embodiments, the PT-RS port is associated with a DeModulation Reference Signal, DMRS, port within a DMRS group. In some embodiments, the PT-RS port is associated with a DeModulation Reference Signal, DMRS, port having a lowest index in a DMRS group. In some embodiments, the PT-RS port association with the DMRS port is a predefined association. In some embodiments, the predefined association is a fixed association rule for associating the PT-RS port with the DMRS port having a lowest index within the DMRS group. In some embodiments, the processing circuitry is further configured to permutate columns of the precoder used for the PT-RS transmission according to the predefined association between the PT-RS port and the DMRS port. In some embodiments, the indication of the layer indicates a column of the precoder associated with a reported precoder matrix indicator, PMI.

According to yet another aspect of the disclosure, a method for a network node is provided. The method includes receiving an indication of a layer for a phase-tracking reference signal, PT-RS, transmission as part of channel state information, CSI, feedback; determining a precoder based at least on the indication of the layer for the PT-RS transmission; and transmitting the PT-RS, the PT-RS transmission associated with the indicated layer and a PT-RS port.

According to this aspect, in some embodiments, the receiving the indication of the layer for the PT-RS transmission as part of the CSI feedback further includes receiving the indication of the layer for the PT-RS transmission as part of the CSI feedback in uplink control information, UCI. In some embodiments, the indication of the layer is based at least on a joint signalling of a rank indicator, RI, and a column permutation indicator, CPI. In some embodiments, the PT-RS port is associated with a DeModulation Reference Signal, DMRS, port within a DMRS group. In some embodiments, the PT-RS port is associated with a DeModulation Reference Signal, DMRS, port having a lowest index in a DMRS group. In some embodiments, the PT-RS port association with the DMRS port is a predefined association. In some embodiments, the predefined association is a fixed association rule for associating the PT-RS port with the DMRS port having a lowest index within the DMRS group. In some embodiments, the method further includes permutating columns of the precoder used for the PT-RS transmission according to the predefined association between the PT-RS port and the DMRS port. In some embodiments, the indication of the layer indicates a column of the precoder associated with a reported precoder matrix indicator, PMI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

As noted above, a challenge faced by NR implementation is Radio-frequency impairments when wireless systems operate in the mmWave band, specifically, the effects of phase noise produced by the local oscillators. Because the degradation produced by phase noise increases with increasing carrier frequency, the physical layer of NR operating in mmWave frequencies should be robust to phase. This problem introduces a need for a new reference signal PT-RS (Phase Tracking Reference Signal). PT-RS can be used both for mitigation of the phase noise induced common phase error (CPE), experienced equally on all subcarriers within an OFDM symbol, and inter-carrier interference (ICI) caused by the loss of orthogonality between subcarriers.

Figure 3:
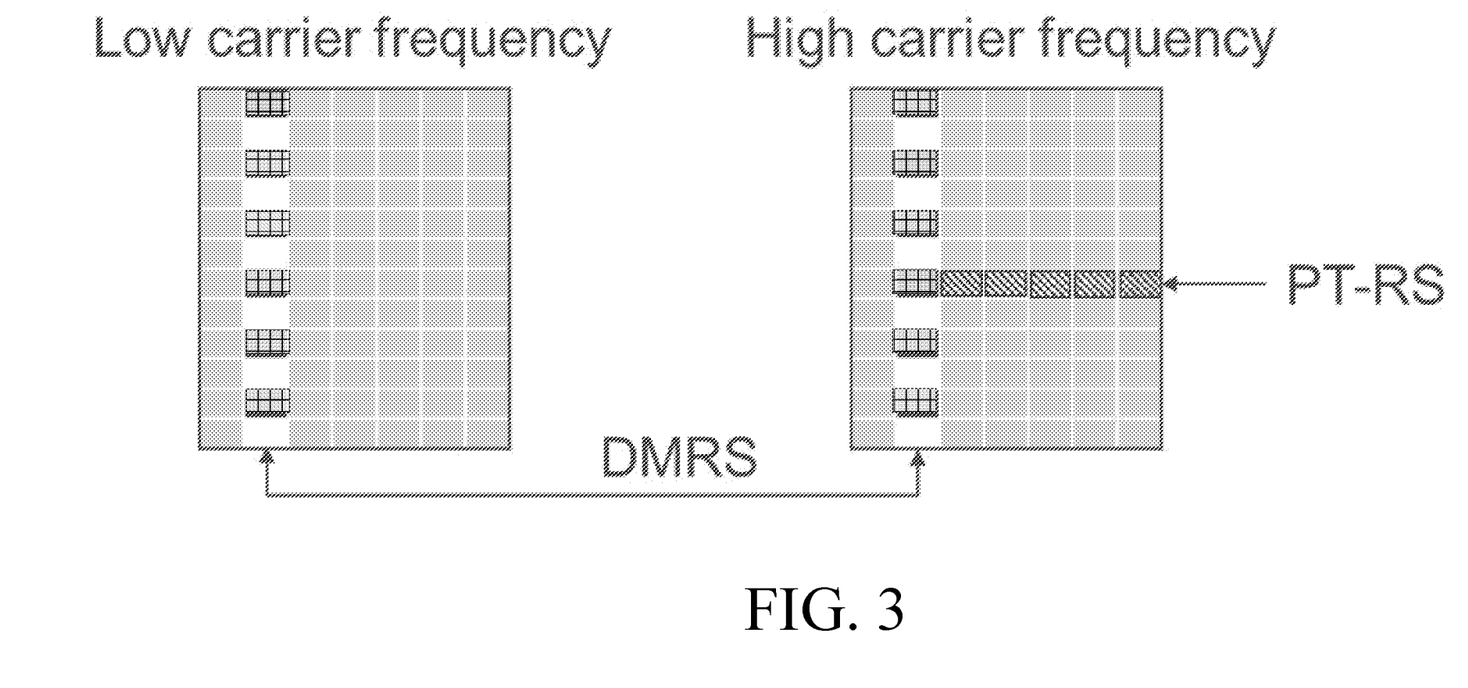
FIG. 3 is a schematic block diagram of the addition of an PT-RS at high carrier frequency in NR.

This PT-RS may be used both in the uplink and the downlink. This signal can be used for both fine carrier frequency-synchronization, and phase noise compensation. This signal is assumed to be present only at high carrier frequencies, while the other properties of the DMRS can remain unchanged or substantially unchanged. An example on adding a PT-RS at high carrier frequencies is depicted in FIG. 3. For example, FIG. 3 illustrates a schematic diagram of the addition of an PT-RS at high carrier frequency in NR.

Phase-tracking reference signal (PT-RS) is only transmitted in one of the ports of a DMRS group. The PTRS is transmitted with the same precoder weights as one of the ports of the DMRS group. So, how to associate the PT-RS to one of the DMRS groups is an important aspect in the PT-RS design.

The problems of the existing solution can be summarized in the following:

Noting that the different DMRS ports will experience different radio channel conditions (due to their different precoding weights), a fixed PT-RS port association for DL without precoding permutation could associate PT-RS with the DMRS port with worse SINR properties within the DMRS group compared to a dynamic association based on expected SINR of the DMRS ports; and Configurable PT-RS port association for DL requires significant additional signalling between network node and wireless device for DL.

The teachings here provide the following advantages:

Helps assure that PT-RS is not associated with the DMRS port that gives the worst SINR (as determined by the wireless device based on downlink reference signals used for CSI-acquisition, i.e., CSI-reference signal (CSI-RS)).

Uses one additional bit in the CSI-feedback, i.e., uses minimal addition resources.

Does not require additional signalling in DL to indicate in which port PT-RS is mapped.

Before describing in detail exemplary embodiments, it is noted that the embodiments reside primarily in combinations of components and processing steps related to methods, network nodes and wireless devices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 4:
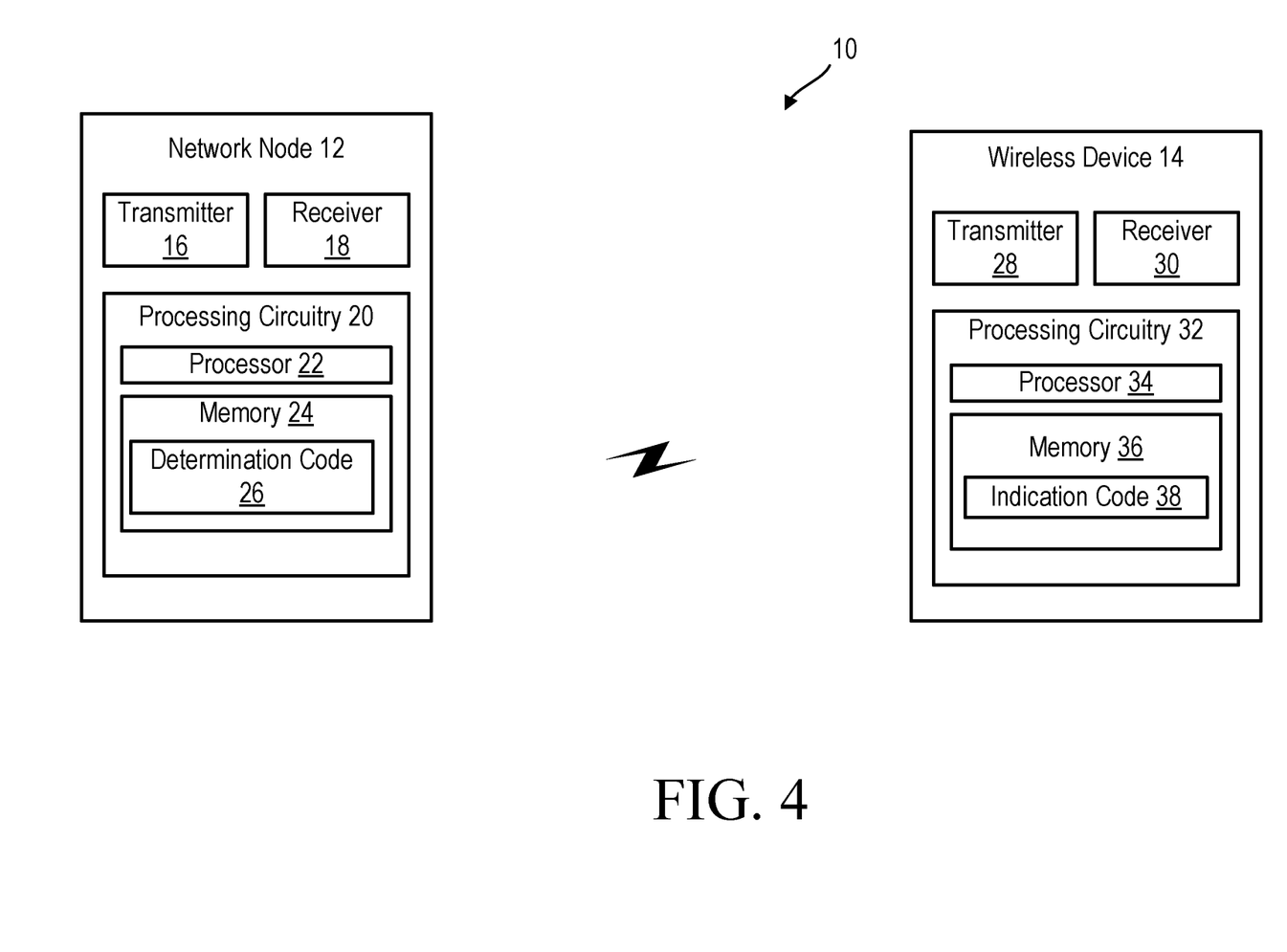
FIG. 4 is a system for PR-RS port selection in accordance with the principles of the disclosure.

Referring now to drawing figures in which like reference designators refer to like elements there is shown in FIG. 4 is a system for PR-RS port selection in accordance with the principles of the disclosure, the system generally referred to as system "10". System 10 includes one or more network nodes 12 and one or more wireless devices 14, in communication with each other via one or more communication networks, paths and/or links using one or more communication protocols, as described herein.

Network node 12 includes transmitter 16 and receiver 18 for communicating with wireless device 14, other nodes 12 and/or other entities in system 10. In one or more embodiments, transceiver 16 and/or receiver 18 include and/or is/are replaced by one or more communication interfaces. Network node 12 includes processing circuitry 20. The term "network node", such as "network node 12" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, gNodeB (gNB), multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by network node 12. Processor 22 corresponds to one or more processors 22 for performing network node 12 functions described herein. Network node 12 includes memory 24 that is configured to store data, programmatic software code and/or other information described herein. In one or more embodiments, memory 24 is configured to store determination code 26. For example, determination code 26 includes instructions that, when executed by processor 22, causes processor 22 to perform the functions described herein such as the functions described with respect to FIG. 8.

The term wireless device such as "wireless device 14" as used herein may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Wireless device 14 includes transmitter 28 and receiver circuitry 30 for communicating with network node 12, other wireless devices 14 and/or other entities in system 10. In one or more embodiments, transmitter 28 and/or receiver 30 include and/or is/are replaced by one or more communication interfaces. Wireless device 14 also includes processing circuitry 32.

Processing circuitry 32 includes processor 34 and memory 36. In addition to a traditional processor and memory, processing circuitry 32 may include integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., data pertaining to communication, e.g., configuration and/or address data of nodes, etc.

Processing circuitry 32 may be configured to control any of the methods and/or processes described herein and/or to cause such methods, signaling and/or processes to be performed, e.g., by wireless device 14. Processor 34 corresponds to one or more processors 34 for performing wireless device 14 functions described herein. Wireless device 14 includes memory 36 that is configured to store data, programmatic software code and/or other information described herein. In one or more embodiments, memory 36 is configured to store indication code 38. For example, indication code 38 includes instructions that, when executed by processor 34, causes processor 34 to perform the functions described herein such as the functions described with respect to FIG. 7.

Figure 5:
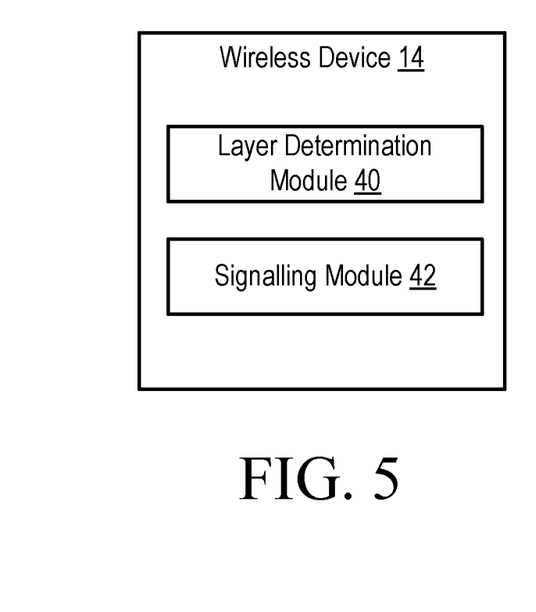
FIG. 5 is an alternative embodiment of a wireless device in accordance with at least some of the principles of the disclosure.

FIG. 5 is an alternative embodiment of wireless device 14 in accordance with at least some of the principles of the disclosure. Wireless device 14 includes a layer determination module 40 configured to determine a layer based at least on a precoder associated with a PMI, as described herein. Wireless device 14 includes a signalling module 42 configured to transmit an indication of the determined layer to a network node 12 as part of channel state information (CSI) feedback, as described herein.

In some alternative embodiments, wireless device 14 may include a reception module configured to receive downlink signals, as described herein. Wireless device 14 may include a determination module that is configured to determine a precoder and rank using the downlink signals, as described herein. Wireless device 14 includes layer determination module 40 that is configured to determine a layer, for a PT-RS transmission for example, based on the determined precoder, as described herein. Wireless device 14 includes signalling module 42 that is configured to signal an indication of the determined layer to a network node using uplink control information (UCI) as part of CSI feedback, as described herein.

Figure 6:
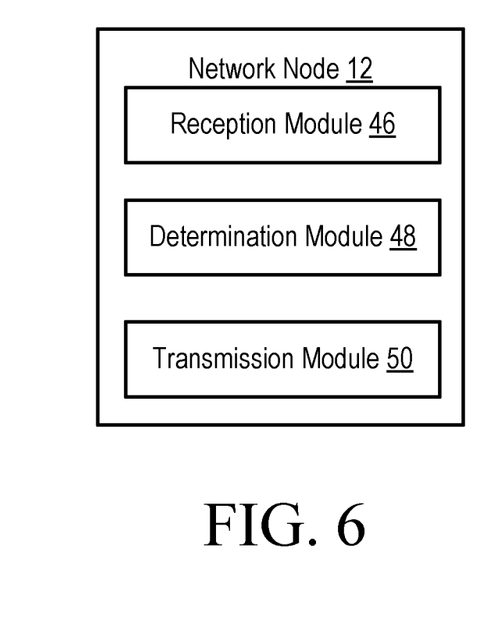
FIG. 6 is an alternative embodiment of a network node in accordance with at least some of the principles of the disclosure.

FIG. 6 is an alternative embodiment of network node 12 in accordance with at least some of the principles of the disclosure. Network node 12 includes reception module 46 configured to receive an indication of a layer for a phase-tracking reference signal (PT-RS) transmission for example, as part of channel state information (CSI) feedback, as described herein. Network node 12 includes determination module 48 configured to determine a precoder based at least on the indication of the layer for the PT-RS transmission, as described herein. Network node 12 includes transmission module 50 configured to transmit the PT-RS, the PT-RS transmission associated with the indicated layer and a PT-RS port, as described herein.

In some alternative embodiments, reception module 46 may be configured to receive the indication of the layer for the PT-RS transmission, using uplink control information (UCI) as part of CSI feedback, as described herein. In one or more embodiments, the PT-RS transmission is based on a permutation of a codebook-based precoder. In one or more embodiments, the permutation of the codebook-based precoder indicates a predefined association between a PT-RS port and a DMRS port.

Although embodiments are described herein with reference to certain functions being performed by network node 12 and/or wireless device 14, it is understood that the functions can be performed in other network nodes and elements. It is also understood that the functions of the network node 12 and/or wireless device 14 can be distributed across the network cloud, such as the Internet or access network backhaul network, so that other nodes can perform one or more functions or even parts of functions described herein.

Figure 7:
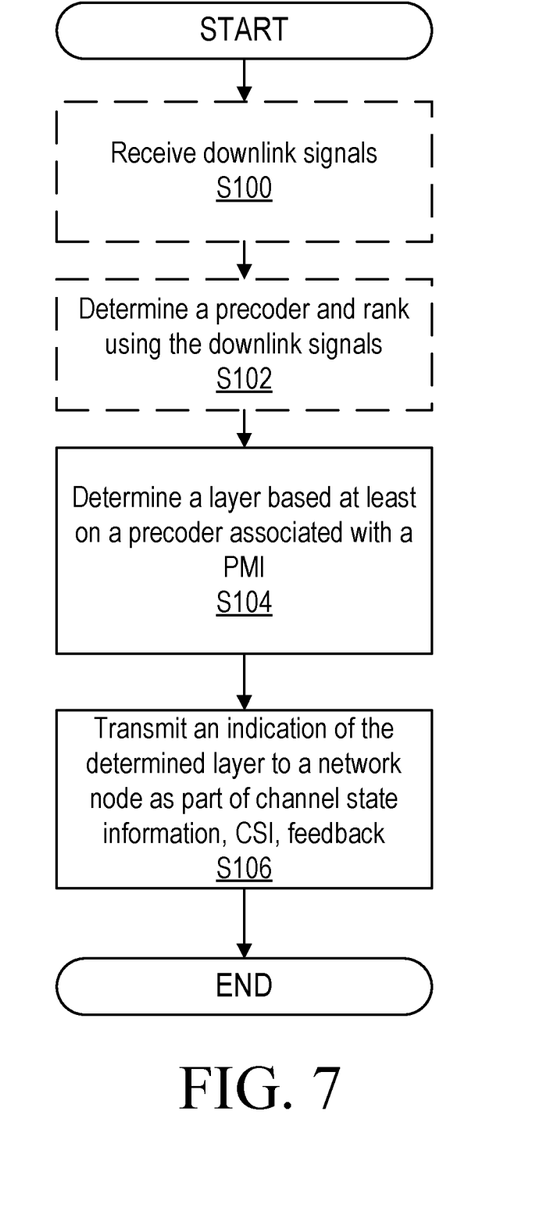
FIG. 7 is a flow diagram of an example of the indication process of indication code in accordance with at least some of the principles of the disclosure.

FIG. 7 is a flow diagram of an example of the indication process of indication code 38 in accordance with at least some of the principles of the disclosure. Processing circuitry 32 is optionally configured to receive downlink signals, as described herein (Block S100). Processing circuitry 32 is optionally configured to determine a precoder and rank using the downlink signals, as described herein (Block S102). Processing circuitry 32 is configured to determine a layer based at least on a precoder associated with a precoder matrix indicator, PMI, as described herein (Block S104). Processing circuitry 32 is further configured to transmit an indication of the determined layer to a network node 12 as part of channel state information (CSI) feedback, as described herein (Block S106).

In some embodiments, the processing circuitry 32 is further configured to transmit the indication of the determined layer to the network node as part of the CSI feedback by being further configured to transmit the indication of the determined layer in uplink control information (UCI). In some embodiments, the indication of the determined layer is transmitted based at least on a joint signalling of a rank indicator, RI, and a column permutation indicator, the processing circuitry 32 is further configured to receive a transmission including at least a phase tracking reference signal, PT-RS, transmission, the PT-RS transmission associated with the determined layer and a PT-RS port. In some embodiments, the PT-RS port is associated with a DeModulation Reference Signal, DMRS, port within a DMRS group. In some embodiments, the PT-RS port is associated with a DeModulation Reference Signal, DMRS, port having a lowest index in a DMRS group. In some embodiments, the PT-RS port association with the DMRS is a predefined association. In some embodiments, the predefined association is a fixed association rule for associating the PT-RS port with the DMRS port having a lowest index with the DMRS group. In some embodiments, the PT-RS transmission is associated with a column of the precoder, the precoder being permutated according to the predefined association between the PT-RS port and the DMRS port. In some embodiments, the received PT-RS transmission uses precoder weights of the precoder, the precoder weights corresponding to the determined layer. In some embodiments, the indication of the layer indicates a column of the precoder associated with the PMI. In some embodiments, the precoder is determined based at least on a received downlink signal.

In some embodiments, the signaling or transmission of the CSI-feedback is performed based on a merged rank indicator (RI) and a column permutation indicator (CPI). In some embodiments, processing circuitry 32 is configured to receive a transmission. The transmission received at wireless device 14 is based on a permutation of a codebook-based precoder that was determined by network node 12. The permutation of the codebook-based precoder indicates a predefined association between a PT-RS port and a DMRS port. In some embodiments, the transmission corresponds to a DMRS port with an index within a DMRS group with precoder weights that corresponds to the determined layer for PT-RS of CSI feedback. In some embodiments, the index within the DMRS group is not the lowest index of the DMRS group.

Figure 8:
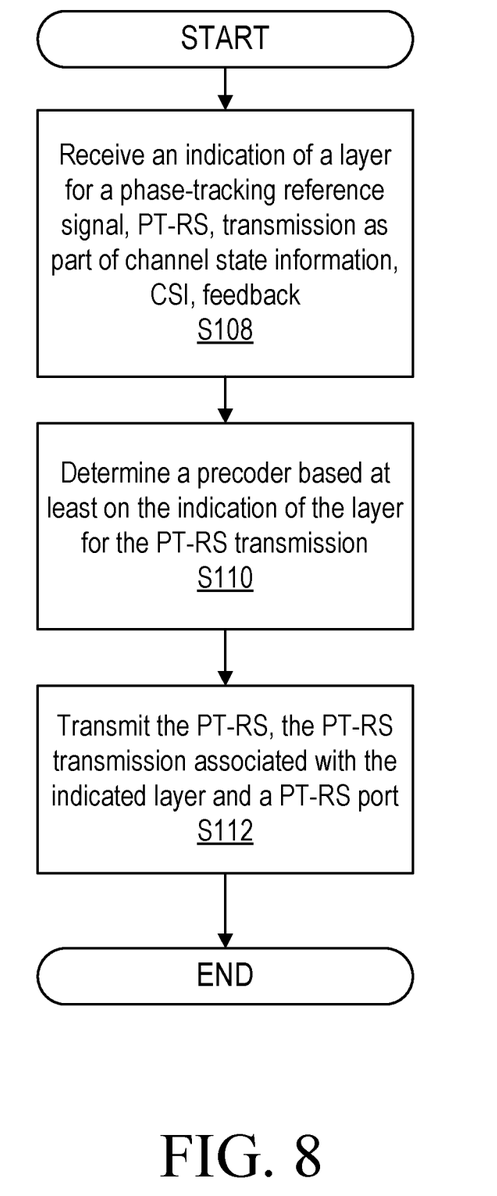
FIG. 8 is a flow diagram of an example of the determination process of determination code in accordance with at least some of the principles of the disclosure.

FIG. 8 is a flow diagram of an example of the determination process of determination code 26 in accordance with at least some of the principles of the disclosure. Processing circuitry 20 is configured to receive an indication of a layer for a phase-tracking reference signal, PT-RS, transmission as part of channel state information (CSI) feedback, as described herein (Block S108). Processing circuitry 20 is configured to determine a precoder based at least on the indication of the layer for the PT-RS transmission, as described herein (Block S110). Processing circuitry 20 is configured to transmit the PT-RS, the PT-RS transmission associated with the indicated layer and a PT-RS port, as described herein (Block S112).

In some embodiments, the processing circuitry 20 is further configured to receive the indication of the layer for the PT-RS transmission as part of the CSI feedback in uplink control information (UCI). In one embodiment, the indication of the layer is based at least on a joint signalling of a rank indicator, RI, and a column permutation indicator, CPI. In one embodiment, the PT-RS port is associated with a DeModulation Reference Signal, DMRS, port within a DMRS group. In one embodiment, the PT-RS port is associated with a DeModulation Reference Signal, DMRS, port having a lowest index in a DMRS group. In one embodiment, the PT-RS port association with the DMRS port is a predefined association. In one embodiment, the predefined association is a fixed association rule for associating the PT-RS port with the DMRS port having a lowest index within the DMRS group. In one embodiment, the processing circuitry is further configured to permutate columns of the precoder used for the PT-RS transmission according to the predefined association between the PT-RS port and the DMRS port. In one embodiment, the indication of the layer indicates a column of the precoder associated with a reported precoder matrix indicator, PMI.

In one or more embodiments, the transmission is based on a permutation of a codebook-based precoder. In one or more embodiments, the permutation of the codebook-based precoder indicates a predefined association between a PT-RS port and a DMRS port. In one or more embodiments, the UCI is based on a merged rank indicator (RI) and a column permutation indicator (CPI). In one or more embodiments, the transmission indicates to a DMRS port with an index within a DMRS group with precoder weights that corresponds to the determined layer for PT-RS of CSI feedback. In one or more embodiments, the index within the DMRS group is not the lowest index of the DMRS group. One or more embodiments described herein relates to how wireless device 14 indicates to network node 12 which layer is preferred for PT-RS transmission (in relation to the precoder associated with the reported PMI). In some embodiments, the signalling is performed over the UCI as part of the CSI-feedback by merging the rank indicator (RI) and the column permutation indicator (CPI). The signalling bits are given by S=f(RI, CPI), where f( ) is a function which takes as inputs the RI and the CPI. In network node 12, once the CSI-feedback has been received, the RI and CPI are recovered using [RI, CPI]=f$^{-1}$(S).

The second step described herein is the permutation of the codebook-based precoder selected by network node 12 for the transmission. The permutation is such that the first column of the precoder used by network node 12 is the column indicated with the CSI-feedback in the CPI. The assumption is made that P is the precoder matrix of the codebook-based precoder of rank N used for the transmission $$P = \begin{pmatrix} P_{1,1} & \cdots & P_{1,N} \\ \cdots & \cdots & \cdots \\ P_{N,1} & \cdots & P_{N,N} \end{pmatrix}$$

The precoder matrix after the permutation is given by $$P'=P \cdot I_N^{CPI+X}$$

where $I_N^c$ is the identity matrix of size N with a circular shift of CPI+X columns. Therefore, the permutation helps ensure that the DMRS port X within the DMRS group is the port selected by wireless device 14.

The third step described herein is the fixed association of the PT-RS port with DMRS port X within the DMRS group (a typical example would be X is lowest index within the DMRS group). This arrangement has an advantage that the process does not require any additional signaling between network node 12 and wireless device 14 to indicate to which port PT-RS has been associated.

Embodiment: Rank 4 Transmission RI and CPI Joint Signalling

For up to Rank-4 transmission, the RI uses 2 bits signalling. By merging the RI and the CPI signalling, the association table between 3 signalling bits and RI and CPI selection can be obtained. Table 1 is used by f(RI, CPI) to determine the value of S.

TABLE 1

Association of RI and CPI with signalling bits for up to rank 4 transmission

| S | RI | CPI |
|---|---|---|
| 000 | 1 | 0 |
| 001 | 2 | 0 |
| 010 | 2 | 1 |
| 011 | 3 | 0 |
| 100 | 3 | 1 |
| 101 | 3 | 2 |
| 110 | 4 | 0 |
| 111 | 4 | 2 |

In this case, for the rank 4 transmission, 2 out of 4 ports can be selected, so it cannot be assured that the port with best SINR is selected. However, the resulting selected port can be assured to not have the worst SINR.

Embodiment: Rank 8 Transmission RI and CPI Joint Signalling

For up to Rank-8 transmission, the RI uses 3 bits signalling. By merging the RI and the CPI signalling, the association table between 4 signalling bits and RI and CPI selection can be obtained.

Table 2 is used by f(RI, CPI) to determine the value of S.

TABLE 2

Association of RI and CPI with signalling bits for up to rank 4 transmission

| bit | RI | CPI |
|---|---|---|
| 0000 | 1 | 0 |
| 0001 | 2 | 0 |
| 0010 | 2 | 1 |
| 0011 | 3 | 0 |
| 0100 | 3 | 1 |
| 0101 | 3 | 2 |
| 0110 | 4 | 0 |
| 0111 | 4 | 2 |
| 1000 | 5 | 0 |
| 1001 | 5 | 2 |
| 1010 | 6 | 0 |
| 1011 | 6 | 3 |
| 1100 | 7 | 0 |
| 1101 | 7 | 3 |
| 1110 | 8 | 0 |
| 1111 | 8 | 4 |

In this case of the rank transmission higher than 3, 2 ports can be selected. The selection is such that selection of the port with the best SINR is not assured, but the selection of a port not having the worst SINR can be assured.

Embodiment: Permutation Operation for Rank-3 Transmission and Fixed DMRS Port 0

For a rank 3 transmission in which the CPI received in the CSI-feedback is 2 and the fixed DMRS port for PT-RS transmission is DMRS port 0, the permutation operation is determined by $$P'=P \cdot I_3^{2+0}$$

where P is the precoder matrix, defined as $$P = \begin{pmatrix} P_{1,1} & P_{1,2} & P_{1,3} \\ P_{2,1} & P_{2,2} & P_{2,3} \\ P_{3,1} & P_{3,2} & P_{3,3} \end{pmatrix}$$

And $I_3^{2+0}$ is the permutation matrix defined as $$I_3^2 = \begin{pmatrix} 0 & 0 & 1 \\ 1 & 0 & 0 \\ 0 & 1 & 0 \end{pmatrix}$$

Finally, the precoder matrix after the permutation is $$P' = \begin{pmatrix} P_{1,2} & P_{1,3} & P_{1,1} \\ P_{2,2} & P_{2,3} & P_{2,1} \\ P_{3,2} & P_{3,3} & P_{3,1} \end{pmatrix}$$

Embodiment: Permutation Operation for Rank-3 Transmission and Fixed DMRS Port 2

For a rank 3 transmission in which the CPI received in the CSI-feedback is 2 and the fixed DMRS port for PT-RS transmission is DMRS port 2, the permutation operation is determined by $$P' = P \cdot I_3^{2+2}$$

where P is the precoder matrix, defined as $$P = \begin{pmatrix} P_{1,1} & P_{1,2} & P_{1,3} \\ P_{2,1} & P_{2,2} & P_{2,3} \\ P_{3,1} & P_{3,2} & P_{3,3} \end{pmatrix}$$

And $I_3^{2+2}$ is the permutation matrix defined as $$I_3^2 = \begin{pmatrix} 0 & 1 & 0 \\ 0 & 0 & 1 \\ 1 & 0 & 0 \end{pmatrix}$$

Finally, the precoder matrix after the permutation is $$P' = \begin{pmatrix} P_{1,3} & P_{1,1} & P_{1,2} \\ P_{2,3} & P_{2,1} & P_{2,2} \\ P_{3,3} & P_{3,1} & P_{3,2} \end{pmatrix}$$

Therefore, the descriptions herein provide a process to assure that in DL, the PT-RS is never associated with the DMRS port with worst SINR properties. One aspect of the disclosure is the permutation of the codebook-based precoder in network node 12, so the fixed DMRS port associated with PT-RS is not mapped to the port with worst SINR. Moreover, the 1 bit of additional signalling in the CSI-RS feedback and no additional signalling in the DL are implemented.

Figure 9:
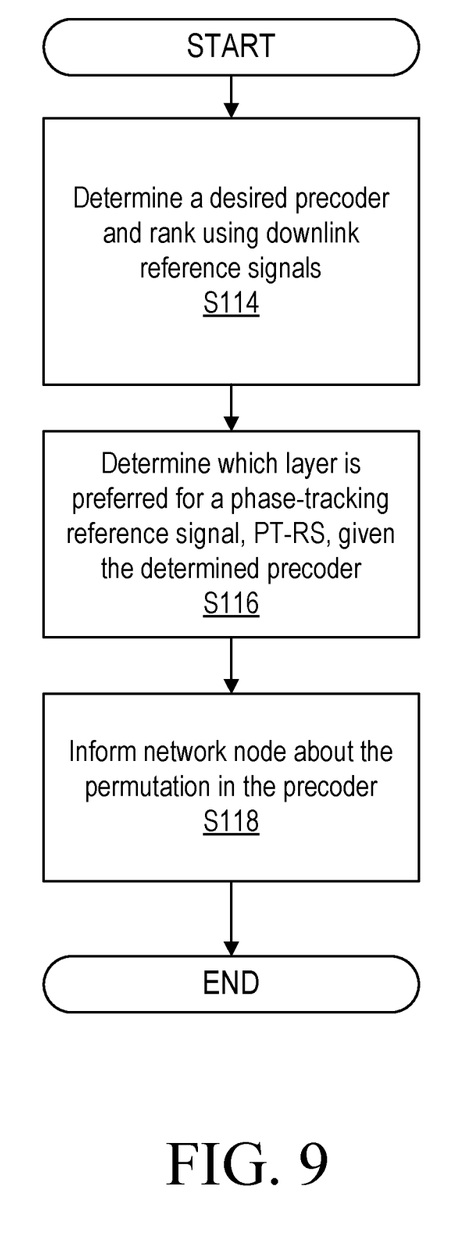
FIG. 9 is a flow diagram of another example of indication code in accordance with at least some of the principles of the disclosure.

FIG. 9 is flow diagram of another example of indication code 38 in accordance with at least some of the principles of the disclosure. Processing circuitry 32 is configured to determine a desired precoder and rank using downlink reference signals, as discussed herein (Block S114). Processing circuitry 32 is configured to determine which layer is preferred for PT-RS given the determined precoder, e.g., using expected SINR as a metric, as described herein (Block S116). Processing circuitry 32 is configured to inform network node 14 about the permutation in the precoder (Block S118). In one or more embodiments, network node assures that the DMRS port with the lowest index within the DMRS group is not the port with worst SINR compared to the rest of the DMRS ports. In one or more embodiments, network node 14 associates the PT-RS to one of the DMRS ports in the DMRS group.

Figure 10:
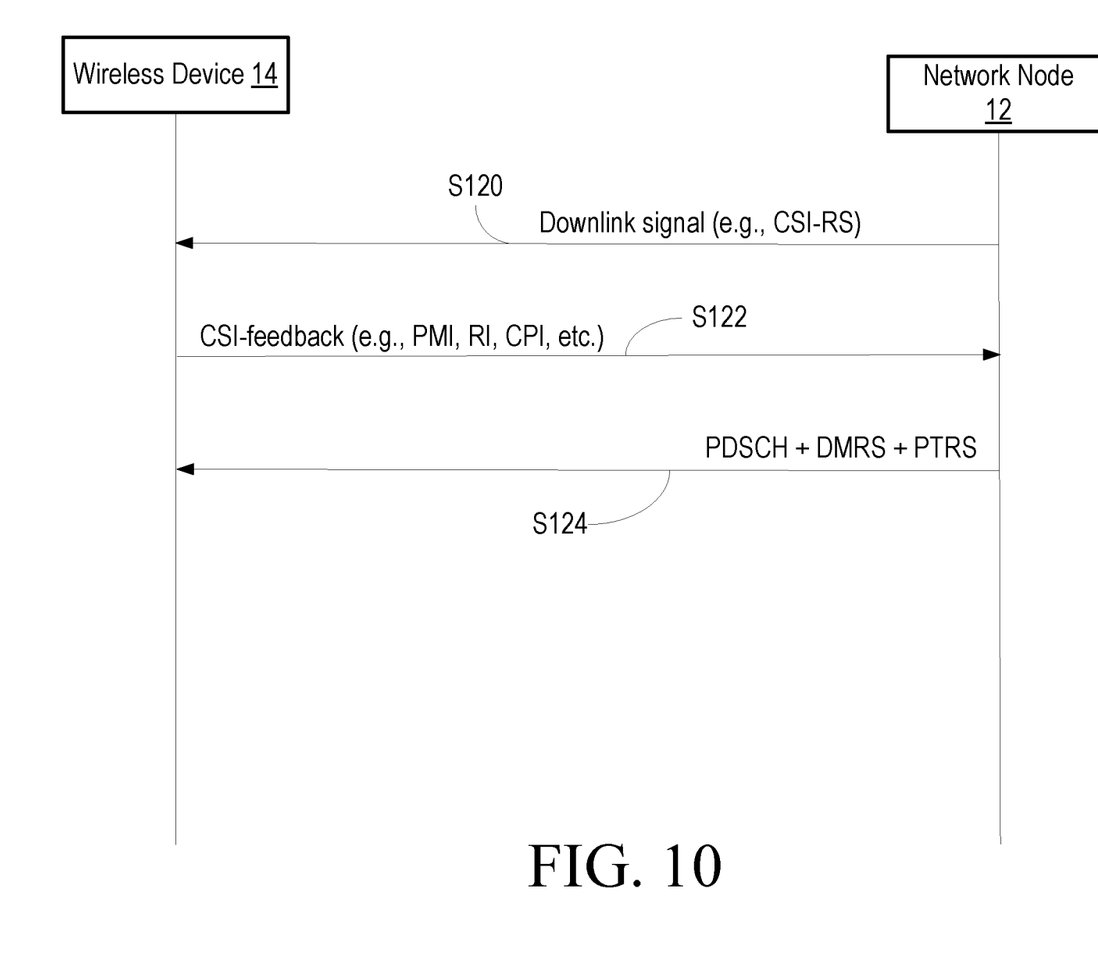
FIG. 10 illustrates an exemplary signalling diagram between the wireless device and the network node, according to at least some of the principles of the disclosure.

FIG. 10 illustrates an exemplary signalling diagram between the wireless device 14 and the network node 12, according to an embodiment of the present disclosure. In one embodiment, the network node 12 may transmit a downlink signal to the wireless device 14 (S120). In some embodiments, the downlink signal may be a downlink reference signal, such as, a downlink reference signal for CSI-acquisition, such as, for example, CSI-RS. Using the downlink reference signal, the wireless device 14 may perform CSI acquisition, such as, for example, determining PMI and RI. In some embodiments, the wireless device 14 may also determine a preferred layer for a transmission, such as, for a PT-RS transmission, and may include an indication of the preferred layer in the CSI-feedback to the network node 12. In some embodiments, the CSI-feedback may include more or less information. The wireless device 14 may communicate the CSI-feedback to the network node 12 (S122) in, for example, UCI. In some embodiments, the indication of the preferred layer may include the column permutation indicator (CPI), which may indicate a number of circular column shifts to be performed by the network node 12 during a permutation of a precoder. Such permutation may be performed to shift columns such that a column corresponding to a preferred layer may be shifted according to a predefined association (e.g., lowest index of DMRS group (e.g., fixed DMRS port 0)). In some embodiments, as explained herein above, the identity matrix $I_N^c$ of size N may be used on the precoder P to perform a circular shift of, for example, CPI+X columns, where X may be the DMRS port index. In other embodiments, the indication of the layer may be performed using other techniques.

The network node 12 may communicate data (e.g., physical downlink shared channel (PDSCH)) and reference signals (e.g., PT-RS, DMRS) based at least on the preferred layer indicated by the wireless device 14 and/or the permutated precoder P' according to the techniques disclosed herein (S124). In one embodiment, the signal transmitted by the network node 12 and received by the wireless device 14 in S124 is DMRS and the PDSCH. Each layer of data (PDSCH) may also contain a unique DMRS so the wireless device 14 can distinguish the channel for each transmitted layer (e.g., by estimating the channel based on the DMRS for that layer). Each transmitted layer (PDSCH+DMRS) may be precoded (e.g., mapped to N antennas), using, for example, a N×1 vector, which can be considered as a column of the N×R precoding matrix, assuming R layers are transmitted. In some embodiments, the PT-RS can be sent using the same layer as the DMRS. In some embodiments, the PTRS is mapped to the first layer according to a predetermined association (which may be known by the wireless device 14 and the network node 12 to reduce signalling). Thus, in some embodiments, the leftmost column of the N×R precoding matrix may actually be used to precode PDSCH+DMRS+PTRS. Accordingly, in some embodiments, there is a predefined association between the first layer DMRS and the layer where PTRS is transmitted. Now, in CSI reporting in S122 using a precoder codebook, if the wireless device 14 reports that, for example, the second layer is the strongest, then the network may use the second column of the codebook based precoder as the first column in the actual data transmission (and thus use the first column as the second column when performing the transmission, i.e., a column switch) via, for example, the permutation disclosed herein above. As such, the wireless device 14 receives the PT-RS and DMRS on the first layer, the first layer being pre-defined but corresponding to the strongest layer due to the permutation. Some embodiments of the present invention may include:

the wireless device 14 reporting a preferred codebook based precoder and which of the R columns of this precoder is the strongest; and/or the PTRS being transmitted in the same layer (e.g., same precoding vector) as the DMRS with the lowest index (i.e., first layer) of, for example, a DMRS group.

Thus, some embodiments of the present invention may provide methods and apparatuses for indicating a preferred layer to a network node 12 and the network node 12 communicating according to the preferred layer and/or a predefined association, which can reduce signalling between the network node 12 and wireless device 14.

Some of the acronyms that may be used in the present disclosure include the following:
3GPP Third Generation Partnership Project
CPI Column Permutation Indicator CRS Cell-Specific Reference Signal
CSI-RS Channel State Information Reference Signal
DMRS De-Modulation Reference Signal
DCI Downlink Control Information
eNB Enhanced NodeB
LTE Long Term Evolution
MIMO Multiple Input Multiple Output
OFDM Orthogonal Frequency Division Multiplexing
PMI Precoding Matrix Indicator
PT-RS Phase Tracking Reference Signal
RI Rank Indicator
RS Reference Signal
TM Transmission Mode
TTI Transmission Time Interval
UE User Equipment
URLLC Ultra-reliable low latency communications As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows. Computer program code for carrying out operations of the concepts described herein may be written in an object-oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:
1. A wireless device, comprising:
processing circuitry including a memory and a processor, the processing circuitry configured to:
determine a layer based at least on a precoder associated with a precoder matrix indicator, PMI;
transmit an indication of the determined layer to a network node in uplink control information, UCI, as part of channel state information, CSI, feedback; and
receive a transmission including at least a phase tracking reference signal, PT-RS, transmission, the PT-RS transmission associated with the determined layer and a PT-RS port, the PT-RS port is associated with a DeModulation Reference Signal, DMRS, port within a DMRS group.
2. The wireless device of claim 1, wherein the PT-RS port is associated with the DMRS port having a lowest index in the DMRS group.
3. The wireless device of claim 1, wherein the PT-RS port association with the DMRS is a predefined association.
4. The wireless device of claim 3, wherein the predefined association is a fixed association rule for associating the PT-RS port with the DMRS port having a lowest index with the DM RS group.

5. The wireless device of claim 3, wherein the PT-RS transmission is associated with a column of the precoder, the precoder being permutated according to the predefined association between the PT-RS port and the DMRS port.

6. The wireless device of claim 5, wherein the received PT-RS transmission uses precoder weights of the precoder, the precoder weights corresponding to the determined layer.

7. The wireless device of claim 1, wherein the indication of the determined layer indicates a column of the precoder associated with the PMI.

8. A method for a wireless device, the method comprising:
determining a layer based at least on a precoder associated with a precoder matrix indicator, PMI;
transmitting an indication of the determined layer to a network node in uplink control information, UCI, as part of channel state information, CSI, feedback; and
receiving a transmission including at least a phase tracking reference signal, PT-RS, transmission, the PT-RS transmission associated with the determined layer and a PT-RS port, the PT-RS port is associated with a DeModulation Reference Signal, DMRS, port within a DMRS group.

9. A network node, comprising:
processing circuitry including a memory and a processor, the processing circuitry configured to:
receive an indication of a layer for a phase-tracking reference signal, PT-RS, transmission in uplink control information, UCI, as part of channel state information, CSI, feedback;
determine a precoder based at least on the indication of the layer for the PT-RS transmission; and
transmit the PT-RS, the PT-RS transmission associated with the indicated layer and a PT-RS port.

10. The network node of claim 9, wherein the PT-RS port is associated with a DeModulation Reference Signal, DMRS, port within a DMRS group.

11. The network node of claim 10, wherein the PT-RS port association with the DMRS port is a predefined association.

12. The network node of claim 11, wherein the predefined association is a fixed association rule for associating the PT-RS port with the DMRS port having a lowest index within the DMRS group.

13. The network node claim 11, wherein the processing circuitry is further configured to permutate columns of the precoder used for the PT-RS transmission according to the predefined association between the PT-RS port and the DMRS port.

14. The network node of claim 9, wherein the PT-RS port is associated with a DeModulation Reference Signal, DMRS, port having a lowest index in a DMRS group.

15. The network node of claim 9, wherein the indication of the layer indicates a column of the precoder associated with a reported precoder matrix indicator, PMI.

16. A method for a network node, the method comprising:
receiving an indication of a layer for a phase-tracking reference signal, PT-RS, transmission in uplink control information, UCI, as part of channel state information, CSI, feedback;
determining a precoder based at least on the indication of the layer for the PT-RS transmission; and
transmitting the PT-RS, the PT-RS transmission associated with the indicated layer and a PT-RS port.

* * * * *